United States Patent [15] 3,678,221
Miller [45] July 18, 1972

[54] DETECTION OF RECORDED CONTROL SIGNALS UPON REPRODUCTION FROM RECORDING MEDIUM

[72] Inventor: Charles W. Miller, Inver Grove Heights, Minn.

[73] Assignee: Minnesota Mining and Manufacturing Company, St. Paul, Minn.

[22] Filed: Sept. 11, 1969

[21] Appl. No.: 857,097

[52] U.S. Cl. ....................179/100.2 S
[51] Int. Cl. ....................G11b 23/36
[58] Field of Search....................179/100.2 S, 100.3 D, 6 E, 179/6 D

[56] References Cited

UNITED STATES PATENTS

| | | | |
|---|---|---|---|
| 2,780,679 | 2/1957 | Vandivere | 179/100.2 S |
| 2,787,669 | 4/1957 | Flan | 179/100.2 S |
| 2,811,588 | 10/1957 | Julie | 179/100.2 S |
| 2,827,515 | 3/1958 | Zuber | 179/6 D |
| 2,864,895 | 12/1958 | Bryant | 179/6 C |

FOREIGN PATENTS OR APPLICATIONS

| | | | |
|---|---|---|---|
| 1,026,684 | 4/1966 | Great Britain | 179/6 D |

*Primary Examiner*—Howard W. Britton
*Assistant Examiner*—Raymond F. Cardillo, Jr.
*Attorney*—Kinney, Alexander, Sell, Steldt & Delahunt

[57] ABSTRACT

An apparatus for detecting a reproduced sinusoidal control signal which is recorded on a recording medium with an informational signal and within the frequency band of the information signal, wherein the recorded amplitude of the informational signal is lower than the recorded amplitude of the control signal at and below the frequency of the control signal. A bistable circuit including a Schmitt trigger is used to detect when a signal reproduced from a recording medium includes a component of at least a minimum amplitude correlated to the recorded amplitude of the control signal. When the bistable circuit detects that the reproduced signal includes a component of at least such minimum amplitude, an integrating circuit is then enabled to determine whether this component also has a one-half cyclic period which is at least the duration of one-half the cyclic period of the control signal.

2 Claims, 5 Drawing Figures

INVENTOR.
CHARLES W. MILLER
BY Kinney, Alexander, Sell, Steldt & DeLaHunt
ATTORNEYS

FIG. 2 FREQUENCY RESPONSE CHARACTERISTICS OF CONVENTIONAL SYSTEMS

FREQUENCY RESPONSE CHARACTERISTICS OF SYSTEMS RELATED TO THE PRESENT INVENTION

INVENTOR.
CHARLES W. MILLER
BY Kinney, Alexander Sell, Steldt & De La Hunt
ATTORNEYS INVENTOR
CHARLES W. MILLER
BY Kinney, Alexander, Sell, Steldt, & DeLaHunt
ATTORNEYS

DETECTION OF RECORDED CONTROL SIGNALS UPON REPRODUCTION FROM RECORDING MEDIUM

BACKGROUND OF THE INVENTION

The present invention relates generally to the art of magnetic recording and reproducing and, more particularly, to recorder/reproducer apparatus which includes means for detecting one or more control signals recorded in conjunction with informational signals and initiating an appropriate response thereto.

DESCRIPTION OF PRIOR ART

Recording and reproducing apparatus frequently combine sound reproduction with a visual display. Examples of such apparatus are audio strip film projectors, sound slide projectors and the like. In such apparatus, the visual display is presented in a series of steps, some of which preferably should be longer than others. Each display step must be coordinated or synchronized with its corresponding sound or aural informational message.

Other recorder/reproducer apparatus employ a magnetic media having a plurality of non-continuous tracks or employ several magnetic media of either a single track or the aforedescribed multi-track design. In this latter type of apparatus, one or more recording/reproducing heads are selectively positioned according to a programmed sequence, at, either or both, one of the plurality of tracks or at an addressable position within a track.

One example of a sound/visual presentation device is described in U.S. Pat. No. 3,233,510 issued Feb. 8, 1966, to R. H. Harrison et al. Harrison employs a tape recorder/reproducer and a slide projector having a slide magazine for holding a plurality of slides. The tape recorder is allowed to run continuously and a slide is continuously displayed for a fixed time equal to one rotation of a camshaft driven at a constant speed and coupled to the slide changing mechanism. A disadvantage of such an arrangement is that the display time for each of the slides is the same. With such an equal display time apparatus, it frequently is impossible to present a harmonious, smoothly flowing program, and sometimes it is impossible to adequately describe a slide during only one rotation of the camshaft.

Another Pat., to M. Schwartz et al., No. 3,230,824, issued Jan. 25, 1966, discloses a device which eliminates the inflexibility of the display time of the apparatus of Harrison et al. by cutting or punching out a portion of the recording medium to provide a notch at the point at which each message ends. In this way, upon detection of the notch, the slide and recording medium may be indexed. Such an arrangement, however, introduces other disadvantages; specifically, the material removed to form a notch cannot be conveniently replaced which makes it impractical in most cases to re-record the medium for use with another slide, or even to record a longer duration recording on the medium for reuse with the same slide.

A further example is set forth in U.S. Pat. No. 3,176,580 issued Apr. 6, 1965 to J. L. Metz. In Metz, a slide holder having a tape storage portion peripheral to a centrally mounted slide is disclosed. A magnetic tape loop within the storage portion has a conductive tab positioned at the end of the recording thereon. During a reproduction cycle, a tape loop is drawn between switch contacts and when the conductive tab passes between the contacts, the switch is closed to activate a slide indexing mechanism. Such an arrangement provides for reusing the tape with different slides and different recordings; however, removal and replacement or repositioning of the tab is time consuming and subjects the magnetic tape to damage.

In U.S. Pat. No. 3,220,126 issued Nov. 30, 1965, to D. Gabrielson, a conventional tape recorder or phonograph is employed and a frequency selective control circuit is used to index a visual media. The control circuit is sensitive to only signals of approximately 30 cycles per second (Hz.) and a 30 Hz. signal is pre-recorded on the recording medium at each point at which it is desired to index the visual media. The control circuit, shown in FIG. 10 of the patent, employs a combination of two filter stages, each of which partially attenuates signals of frequencies other than 30 Hz. and a parallel T null network with feedback to the second filter stage to produce a substantially pure 30 Hz. output from the network. Additional circuitry responsive to a 30 Hz. signal is provided to activate the visual display index mechanism. As will be apparent from a review of the circuit schematic shown in FIG. 10 of the patent and from the foregoing description, Gabrielson requires a relatively large amount of circuitry in order to discriminate between a recorded informational signal and a 30 Hz. control signal.

Other systems are known in which a "beep" or similar sound is recorded on the tape or record at each point corresponding to a video display change. An operator, upon hearing a beep, manually initiates a change. The audience in most instances also hears the beep. With the audience being thus repeatedly distracted from the presentation, the effectiveness of a program is seriously reduced.

In addition to the problems associated with the reproducing feature of the devices just discussed, it will also be readily appreciated that to indicate an indexing point, attendant disadvantages of the devices of Schwartz and Metz are that they require either manual handling of the recording media or provision of a mechanical device solely for that purpose.

SUMMARY OF THE INVENTION

The foregoing and other disadvantages of the prior art are eliminated in an embodiment of the present invention wherein a magnetic recorder/reproducer apparatus is provided with means for detecting, at least one control signal recorded along with informational signals on a magnetic media. To better understand the detection apparatus of the present invention the technique of recording the control signal is first discussed. The control signal, which may be recorded either automatically or by an operator, is recorded at each point on a recording track of the magnetic media at which the reproduction operation is to be advanced or indexed. The control signal and informational signal amplitude correspond, respectively, to approximately saturation level and to normal record level of the media in which said signals are to be recorded. The control and informational signals are fed to a write winding of the recording apparatus. The control signals are fed directly to the write winding but the informational signals are fed through a component having a low-gain non-linear response region to thereby attenuate or limit informational signals of a frequency within said non-linear region. The control signal is selected to have a duration corresponding to the half-period of a frequency within said non-linear region. The recorder/reproducer includes a read/write head having a read winding and a write winding, means for impressing an informational signal on said write winding, and means for impressing a control signal on said write winding. The frequency response of the means for impressing the informational signal is characterized by a low-gain non-linear region and a linear region of response. The control signal is selected to have both a frequency within this non-linear region and an amplitude greater than a maximum amplitude informational signal of a frequency equal to or less than said control signal frequency. During playback, the read winding reproduces control and informational signals and the detection apparatus of the present invention which is coupled to the read winding produces an operation-advance-signal when a reproduced signal is a control signal. Further means may be provided which are responsive to each operation-advance-signal to initiate an action appropriate to the operation-advance signal.

In accordance with the present invention, detection of a control signal is accomplished by first detecting when a signal reproduced from the recording medium includes a component of at least a minimum amplitude correlated to the recorded amplitude of the control signal, and upon detecting that the reproduced signal does include a component of at least this minimum amplitude, then determining whether this component is also of a frequency not greater than the control signal frequency. Specifically, the determination is of whether this component has a cyclic period of at least a minimum duration correlated to the frequency of the control signal. Preferably the control signal is a sinusoidal signal having a given cyclic period; in which case, the determination step comprises detecting whether the signal component also has a one-half cyclic period which is at least the duration of one-half the cyclic period of the control signal. The detecting means comprise a bistable circuit which resides in a quiescent state to produce a first amplitude output signal when not detecting a reproduced signal component having an amplitude greater than the minimum amplitude, and which resides in a non-quiescent state to produce a second amplitude output signal when detecting a signal reproduced component greater than the minimum amplitude. The determining means includes both an integrating circuit which in response to the second amplitude output signal produces an analog signal, the amplitude of which is directly proportional to the duration of the second amplitude output signal, and a trigger circuit for reproducing a response signal such as an operation-advance signal when the amplitude of the analog signal reaches a specified level.

DETAILED DESCRIPTION OF PREFERRED EMBODIMENTS

Figure 1:
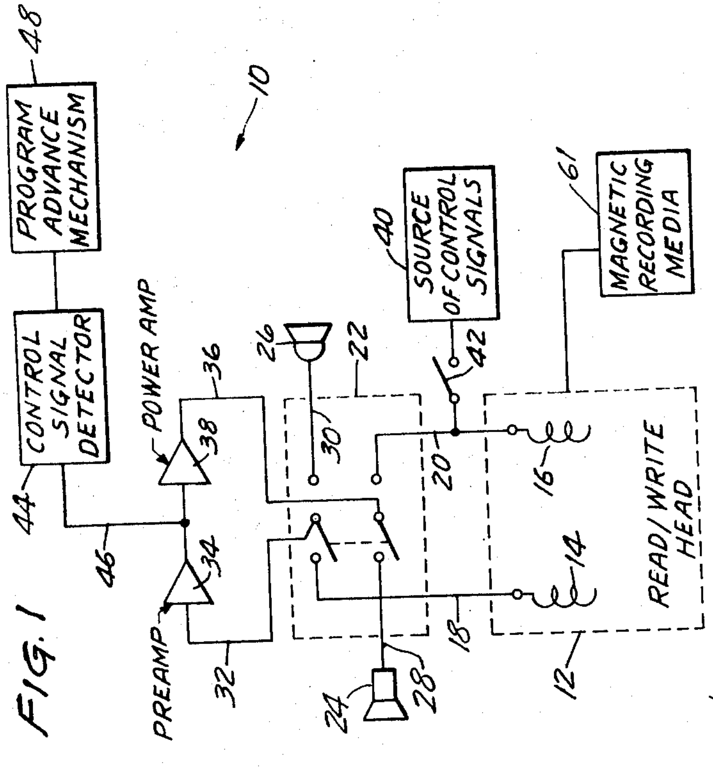
FIG. 1 is a block diagram of a recorder/reproducer apparatus including a control signal recording circuit and the detection circuit of the present invention.

With reference to FIG. 1, a recorder/reproducer apparatus shown generally as 10 includes a read/write head 12 having a read winding 14 and a write winding 16 coupled, respectively, by leads 18 and 20 to a double pole, double throw switch 22. A speaker 24 and a microphone 26 are also coupled, respectively, by leads 28 and 30 to switch 22. Switch 22 is shown to connect an input lead 32 of a preamplifier 34 with the read winding 14 of read/write head 12 while simultaneously connecting speaker 24 with an output lead 36 of power amplifier 38 or, alternatively, to connect the input of preamplifier 34 with microphone 26 while simultaneously connecting the output of power amplifier 38 with write winding 16 of read/write head 12. A source of control signals 40 is also connected via a normally open switch 42 to the read/write winding 16 and a control signal detector 44 is connected by lead 46 to the output of preamplifier 34 which output is also the input of power amplifier 38. The output of control signal detector 44 is provided as an input to a program advance mechanism 48.

The microphone, preamplifier, both switches, the read/write head and the speaker are of standard constructions and designs well known to the art. The power amplifier, however, is designed to have an unusual frequency response which makes possible utilization of inexpensive, reliable, easily operable circuits for introducing a control signal at any point on a magnetic recording media and for detecting said control signal and initiating an appropriate response thereto during playback of the recording.

Figures 2, 3:
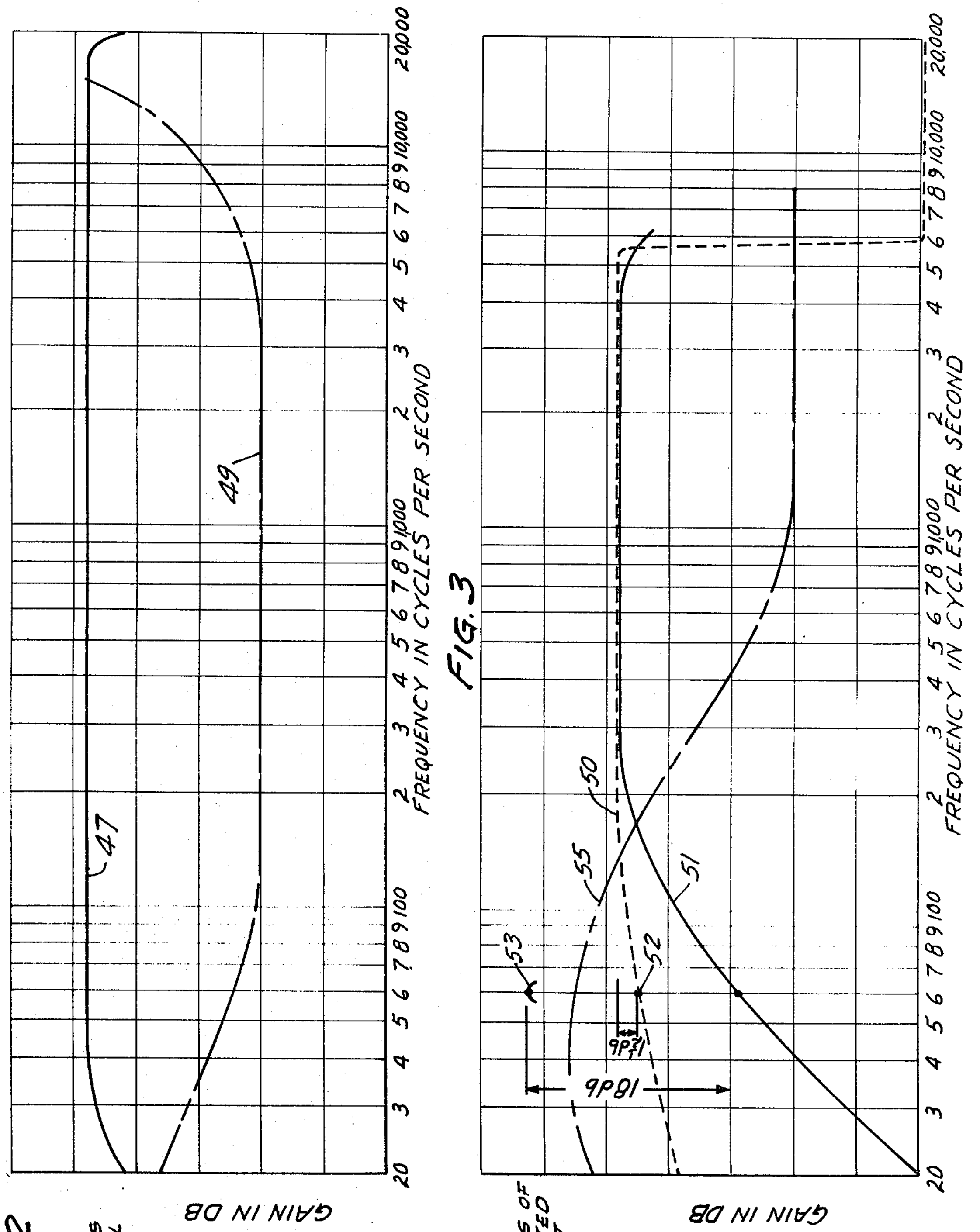
FIG. 2 is a graph of frequency response characteristics of conventional systems wherein gain is plotted along the ordinate in decibels and frequency is plotted along the abscissa.
FIG. 3 is a graph of frequency response characteristics of system related to the present invention wherein gain is plotted along the ordinate in decibels and frequency is plotted along the abscissa.

FIG. 2 shows frequency response curves of amplifiers typically used in conventional recorder/reproducer apparatus. Curve 47 illustrates the frequency response of a power amplifier suitable for use during both recording and playback. As shown, the response is essentially linear throughout the entire range of operation of the amplifier, shown to extend from 40 hertz to 18 kiloHertz. Curve 49 illustrates the frequency response of an amplifier of the type frequently used either in a record only apparatus or as the record amplifier of an apparatus having separate amplifiers for recording and playback. The curve 49 shows that the response of such a "record" amplifier has a high-gain non-linear response region bordering both extremities of a linear operating region. From the curves 47 and 49, it is apparent that the amplifier response to a low frequency signal, for example a 60 Hz. signal, is at least as great as for signals of a frequency within the amplifier regions of linear response.

FIG. 3 is a graph which both shows a typical frequency response curve of the power amplifier used with the detection scheme of the present invention and shows frequency response curves corresponding to reproduced informational and control signals. Curve 50 of FIG. 3 is typical of the frequency response of a power amplifier 38 of the present invention. As shown in curve 50, the power amplifier response has a low-gain non-linear region extending from about 20 Hz. to about 200 Hz. The gain at 60 Hertz, designated as 52, is about 1 ½ db less than the linear region gain. Curves 51 and 53 are typical frequency response curves for, respectively, informational signals and a 60 Hertz control signal as seen at the output of preamplifier 34 following reproduction of signals recorded by a recorder apparatus of the present invention. As shown, the control signal and informational signal response at 60 Hertz differ by about 18 db, thus permitting electronic sensing of the control signal. One skilled in the art will appreciate that components of the recorder/reproducer apparatus other than the power amplifier have non-linear responses. The microphone 26, for example, may have a region of non-linear response and could be specifically designed to have a sufficiently non-linear response to provide the function now provided by power amplifier 38. In any event, the degree of non-linearity required is primarily dependent upon the sensitivity of the amplitude discriminating circuit portion of control signal detector 44.

It can thus be seen that a control signal will have characteristics different from all informational signals if the power amplifier is by-passed and the control signal applied directly to the write winding, provided the control signal is selected to be both in the power amplifier's non-linear region of operation and of an amplitude greater than the maximum amplitude of a received energy signal of like frequency. The source of control signals 40 may conveniently be standard 115 volt, 60 cycle line voltage applied through a step down transformer and conventional current limiting and voltage dividing circuits. The control signal detector may likewise be an inexpensive, highly reliable circuit of well known design, consisting for example simply of a two stage circuit, one stage of which discriminates against all signals of a frequency greater than the control signal frequency and another stage which discriminates against signals having an amplitude less than the control signal amplitude. In this regard, it should be noted that even though the control signal amplitude is sensibly greater than that of informational signals of like frequency, by selecting the control signal frequency to be at a point of low gain of the non-linear component of the recorder, the amplitude of the corresponding electrical signal impressed onto the recorder write-winding may actually be less than that of similarly impressed signals corresponding to received energy informational signals. The control signal may conveniently be a sinusoidal signal though it need not be. It may be a unipolar signal of changing amplitude, e.g., a sawtooth wave, or it may be a bi-polar signal.

Control signal detector 44 may be any circuit which provides an output signal in response to an input signal characterized by both a cyclic period duration correlated to the control signal frequency within the non-linear operating region of record section amplifier 38 and an amplitude greater than a maximum amplitude informational signal of like frequency. The maximum amplitude of the received energy signal depends in part upon the intensity of the particular sounds being recorded and in part upon adjustment of the volume control during recording, the latter of which, knowing the expected maximum intensity of the low-frequency spectrum to be recorded, can be varied as desired to control the differential between the control signal and informational signal amplitudes. Other significant variables affecting the control signal maximum amplitude are saturation characteristics of both the recording media and recording head.

The program advance mechanism 48 will depend upon the particular application. When the invention is used with a sound-slide projector, it may be a circuit for actuating the slide indexing mechanism; in a strip film projector, it could be a mechanism for indexing the strip. If the invention were used in a device for playing either or both several tapes or several tracks or portions of tracks of a single tape according to a programmed sequence, the program advance mechanism 48 could be a logic device for controlling the positioning of one or more write heads according to a stored program.

Figure 4:
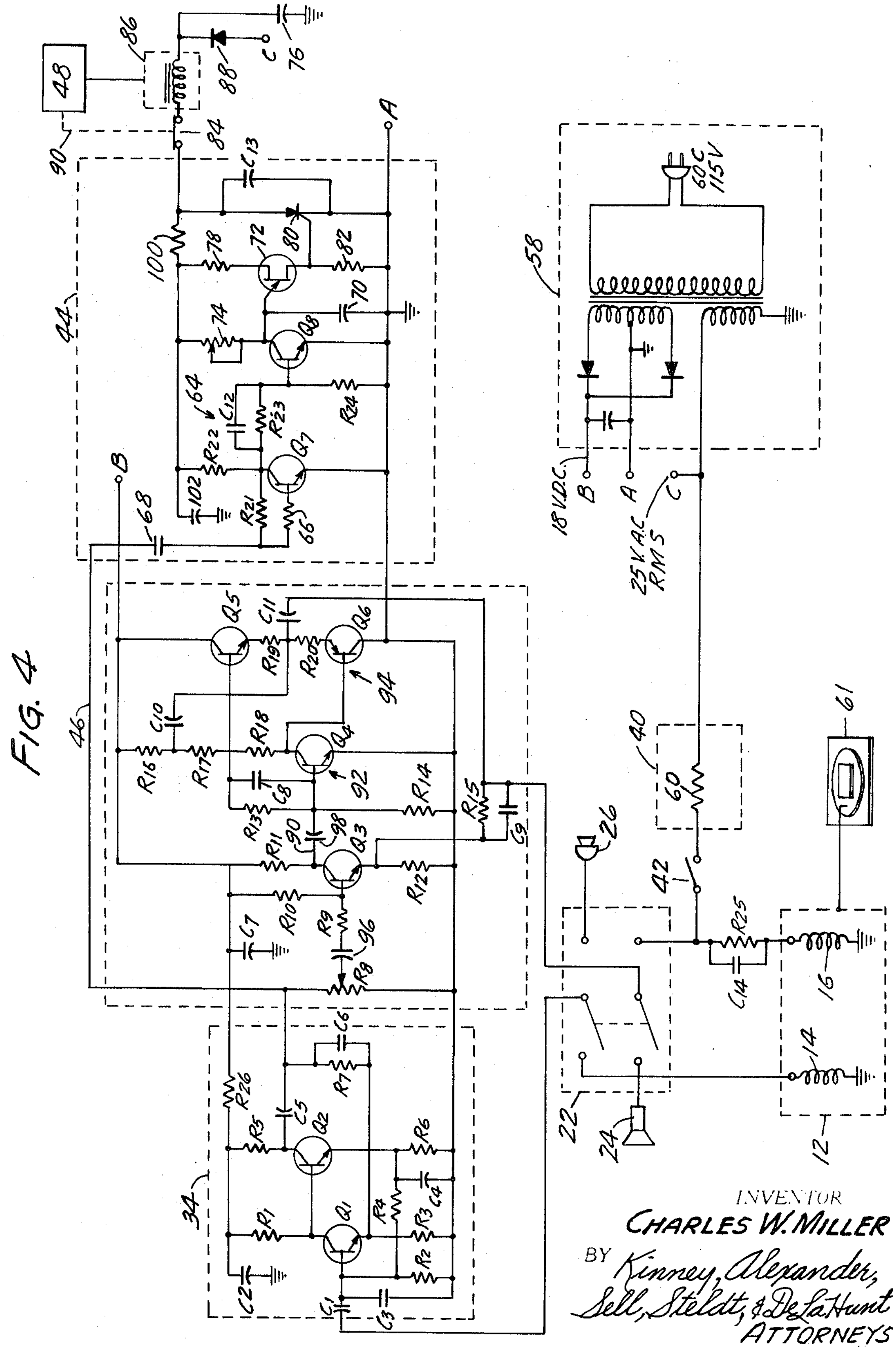
FIG. 4 is a combinational block and schematic diagram of embodiments of a control signal circuit and the detection circuit of the present invention particularly useful in a sound slide projector system.

A preferred embodiment of the present invention, specifically designed for use in a sound-slide projector system, is shown in partial block and partial schematic form in FIG. 4. The control signal source 40 is shown to comprise a 60 cycle, 25 volt (root-mean-square) source of potential 58 coupled by a resistor 60 to normally open switch 42. Resistor 60 is selected to provide a recording signal having an amplitude just slightly less than that required to saturate a recording media 61. In a preferred embodiment, a sound-slide projector, the media 61 is a disc of magnetic media having an aperture suitable for accepting a film-slide. A spiral groove around the aperture is provided as the recording track. The control signal detector 44 is shown to comprise a Schmitt trigger, designated generally as 64, resistively and capacitively coupled, respectively, by resistor 66 and capacitor 68 to the output of preamplifier 34 by lead 46. Schmitt trigger 64 has its output applied to one plate of a capacitor 70, which capacitor plate is also common to both the emitter leads of a unijunction transistor 72 and, through an adjustable resistor 74, to a source of potential 76. One base of unijunction transistor 72, is connected by a current limiting resistor 78 to a source of current. The other base of unijunction transistor 72 is commonly connected to the gate lead of an SCR 80 and a resistor 82. The anode and cathode of SCR 80 are coupled in series through a normally closed, momentary action switch 84 to the pull-in coil of a relay 86. The other side of said pull-in coil is coupled through diode 88 to a source of potential, for the specific embodiment, the 25 volt, 60 Hz. terminal of source of potential 58 converted by a capacitor 76 to about 35 volts D.C. Relay 86 provides the input to the program advance mechanism 48, which for the preferred embodiment is the sound-slide projector slide indexing mechanism, which is shown by dashed line 90 to actuate the normally closed, momentary action switch 84. The preamplifier 34 is of straight forward design and operation, preferably having a gain vs. frequency response curve such as shown as curve 55 in FIG. 3. The power amplifier 38 too is in most respects of a conventional design having a pre-driver stage 90, driver stage 92, and an output stage 94. The pre-driver stage 90 is capacitively coupled to the preamplifier 34 output by capacitor 96 and the pre-driver and driver stages are similarly capacitively coupled by capacitor 98. It is common to capacitively couple in this manner, however, normally the values of capacitors 96 and 98 are chosen to pass low frequency signals without substantial attenuation. In the present invention, the values of capacitors 96 and 98 are specifically chosen to attenuate low frequency signals so as to produce the non-linear region of the curve 50 of FIG. 3.

In operation, when it is desired to record an informational message corresponding to a slide to be projected, the switch 22 is placed in a position to connect the microphone 26 through preamplifier 34 and power amplifier 38 to write winding 16. After all informational signals have been recorded switch 42 is momentarily closed to directly couple the source of control signals 40 to the write winding 16.

During playback, switch 22 couples the read winding 14 to preamplifier 34. Portions of a reproduced informational signal may have sufficient amplitude to switch Schmitt trigger 64 of the control signal detector into its non-quiescent state. Because, however, such signals would be of a high frequency (in the linear operating range of the power amplifier 38), their duration would not be sufficiently long for capacitor 70 to charge to the peak emitter voltage of unijunction transistor 72. That is to say, the capacitor 70 and its associated adjustable resistor 74 through which it charges, discriminate against all signals of a frequency higher than the control signal frequency. Similarly, a combination of capacitor 68 and resistor 66 attenuates signals of amplitudes less than the control signal to prevent them from switching Schmitt trigger 64 into its non-quiescent state, thus the Schmitt trigger 64 discriminates against signals of an amplitude less than the control signal. When, however, a control signal is reproduced by read winding 14, because it was not attenuated by the non-linear action of the power amplifier 38, during recording, it is of sufficient amplitude to switch Schmitt trigger 64 into its non-quiescent state. Schmitt trigger 64 now remains in its non-quiescent state sufficiently long that capacitor 70 reaches a charge sufficient to forward bias unijunction transistor 72. When the unijunction transistor conducts, the voltage produced across resistor 82 appears at the gate lead of SCR 80 to trigger SCR 80 into conduction. The 35 volt D.C. potential is thereby effectively short-circuited to ground through the pull-in coil of the relay 86. Accordingly, relay 86 closes to produce an output signal to the program advance mechanism 48 which was previously said to be a slide indexing mechanism. During the slide indexing operation, switch 84 is momentarily opened, thereby removing the forward bias to SCR 80 and causing it to cease conducting. Resistor 100 and capacitor 102 will prevent undesired triggering of the unijunction transistor as a result of 60 cycle noise produced by the change mechanism motor and picked up by the read winding.

Component values for one embodiment of the circuit of FIg. 4 are as follows:

| Preamplifier 34: | | Power amplifier 38: | |
|---|---|---|---|
| C1 | 10μf, 16 V. | C96 | .22μf |
| C2 | 400μf, 10 V. | C98 | .47μf |
| C3 | .005μf | C 7 | 125μf, 16 V. |
| C4 | 25μf, 6.4 V. | C 8 | .001μf |
| C5 | 10μf, 16 V. | C 9 | .001μf |
| C6 | 330μf | C10 | 40μf, 16 V. |
| R1 | 33 K Ω | C11 | 400μf, 16 V. |
| R2 | 33 K Ω | R 8 | 50 K Ω |
| R3 | 100Ω | R 9 | 330Ω |
| R4 | 56 KΩ | R10 | 390 KΩ |
| R5 | 4.7 KΩ | R11 | 1.8 KΩ |
| R6 | 1.5 KΩ | R12 | 47 Ω |
| R7 | 10 KΩ | R13 | 15 KΩ |
| Q1 | 2N 3392 | R14 | 1.5 KΩ |
| Q2 | 2N 3900 | R15 | 18 KΩ |
| R26 | 3.3 K | R16 | 220Ω |
| | | R17 | 470Ω |
| | | R18 | 22Ω |
| | | R19 | .47Ω, 2W |
| | | R20 | .47Ω, 2W |
| | | Q 3 | 2N 3393 |
| | | Q 4 | 2N 3393 |
| | | Q 5 | 2N 4077 |
| | | Q 6 | 2N 4078 |

| Detector 44: | | Silicon Controlled Rectifier | C,106 A2 |
|---|---|---|---|
| **68** | 2.5μf | | |
| **70** | 2.5μf, 16 V. | Unijunction Transistor Q | **2N 2646** |
| **102** | 400μf, 16 V. | | |
| **C12** | .1μf | | |
| **C13** | .047μf | Relay **86** | coil **24** VDC |
| **66** | 47 KΩ | | |
| **74** | 5 KΩ | Diode **88** | CER **67** |
| **78** | 220Ω | | |

| | | | |
|---|---|---|---|
| 82 | 100Ω | Capacitor 76 | 64μf, 64 V. |
| 100 | 1.2 KΩ | | |
| 21 | 330 KΩ | Speaker 24 | 8 ohm 7.68 cm × 12.80 |
| 22 | 10 KΩ | | |
| 23 | 27 KΩ | | |
| 24 | 68 KΩ | Microphone 26 | ceramic microphone 500Ω Impedance |
| Q 7 | 2N 3900 | | |
| Q 8 | 2N 3900 | | |
| Magnetic media 61 a 0.75 mil thick, randomly oriented coating comprising about 2½ parts by weight of acicular gamma ferric oxide 1 part by weight of a vinyl copolymer. The coating has a remanent flux density of 0.8 lines per quarter inch and a coercivity of 235 oersteds. | | Read/write head 12 | 140 mh inductance |
| | | Resistor R 25 | 15 K |
| | | Capacitor C 14 | .0068μf |
| | | Resistor 60 | 6.2 K |

12 tance
Resistor R 25 15 K
Capacitor C 14 .0068μf
Resistor 60 6.2 K

For a circuit of FIG. 4 having components with the foregoing values, measured values of normal record current through the head for a 1 kHz. informational signal, for normal record current through the head at 60 Hz. informational signal, and record current through the head for a 60 Hz. control signal are, respectively, 100 μamp., 40 μamp., and 280 μamp. The circuit thus provides an informational signal recording level which is about 12 db below the saturation level of the recording media, considered generally to be a normal recording level.

Figure 5:
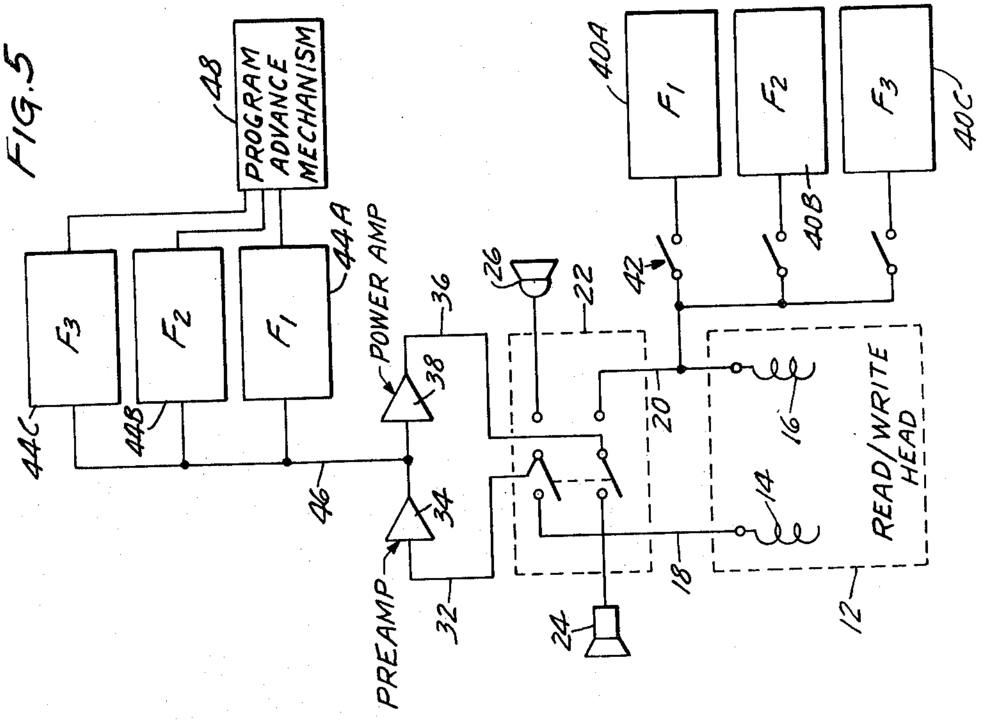
FIG. 5 is a block diagram illustrating a recorder/reproducer apparatus and a plurality of pairs of control signal recording and detecting circuits.

FIG. 5 is a block diagram of a system employing a plurality of control signal sources 40, shown as 40A, 40B and 40C. Each control signal source corresponds to a unique operational step. For example, source 40A, having a frequency of $f_1$, could correspond to dimming or turning off the lights in the room in which the sound-slide program was being presented; control source 40B, having a frequency of $f_2$, could correspond to the indexing of a slide mechanism at the end of a message; and control source 40C, having a frequency of $f_3$, could correspond to turning the lights on at the end of the presentation. The detecting circuit counterparts of each of control signal sources 40A, 40B and 40C are shown, respectively, as 44A, 44B and 44C. To prevent one control signal from triggering more than one control signal detector, the control signals impressed on write winding 16 could be of different amplitudes, or, each of control signal detectors 44A, 44B and 44C could be provided with a filter which would accept only one of the three control signal frequencies.

One skilled in the art will readily appreciate the ease with which the present invention permits an operator to place a control signal on any point on a magnetic media. An operator may erase a combination of an earlier recorded information signal and a corresponding control signal and record a new combination, even one of a different duration, with similar ease.

One skilled in the art will readily appreciate that the foregoing embodiments are merely exemplary and therefore that many other modifications, improvements and the like can be made without departing from the spirit of the present invention.

What is claimed is:

1. In a reproducing system, apparatus for detecting a control signal of a given frequency which is recorded on and reproduced from a recording medium together with an informational signal, which control signal is within the frequency band of the informational signal, wherein the recorded amplitude of the informational signal is lower than the recorded amplitude of the control signal at and below the frequency of the control signal, comprising detecting means for detecting when a signal reproduced from a said recording medium includes a component of at least a minimum amplitude correlated to the recorded amplitude of the control signal, wherein said detecting means comprises a bistable circuit which resides in a quiescent state to produce a first amplitude output signal when not detecting a reproduced signal component having an amplitude greater than said minimum amplitude, and which resides in a non-quiescent state to produce a second amplitude output signal when detecting a signal reproduced component greater than said minimum amplitude; and determining means coupled to the detecting means to be enabled when the detecting means detect that said reproduced signal includes a component of at least a minimum amplitude, to determine whether said component of at least a minimum amplitude also has a cyclic period of at least a minimum duration correlated to the frequency of the control signal, wherein said determining means includes both an integrating circuit which in response to said second amplitude output signal produces an analog signal, the amplitude of which is directly proportional to the duration of said second amplitude output signal, and a trigger circuit for producing a response signal such as an operation-advance signal when the amplitude of said analog signal reaches a specified level.

2. The detection apparatus of claim 1, wherein said bistable circuit is a Schmitt trigger; wherein said integrating circuit is a resistor-capacitor integrating circuit, and wherein said trigger circuit is a unijunction transistor having its emitter coupled to sense the charge stored in said capacitor.

* * * * *